United States Patent
Mukhopadhyay et al.

(10) Patent No.: US 8,643,969 B2
(45) Date of Patent: Feb. 4, 2014

(54) VOLTAGE-MODE DRIVER

(75) Inventors: Rajarshi Mukhopadhyay, Allen, TX (US); Matthew D. Rowley, Parker, TX (US)

(73) Assignee: Texas Instruments Incorporated, Dallas, TX (US)

( * ) Notice: Subject to any disclaimer, the term of this patent is extended or adjusted under 35 U.S.C. 154(b) by 107 days.

(21) Appl. No.: 13/457,175

(22) Filed: Apr. 26, 2012

(65) Prior Publication Data

US 2013/0286499 A1    Oct. 31, 2013

(51) Int. Cl.
    *G11B 5/09*    (2006.01)
(52) U.S. Cl.
    USPC .......................................................... 360/46
(58) Field of Classification Search
    CPC ....................................................... G11B 5/022
    See application file for complete search history.

(56) References Cited

U.S. PATENT DOCUMENTS

| | | | |
|---|---|---|---|
| 6,285,221 B1 | 9/2001 | Leighton et al. | |
| 6,970,316 B2 * | 11/2005 | Venca et al. | 360/61 |
| 7,408,313 B1 | 8/2008 | Kong et al. | |
| 7,656,111 B1 | 2/2010 | Chan et al. | |
| 7,848,038 B1 * | 12/2010 | Tan et al. | 360/46 |
| 7,880,989 B1 | 2/2011 | Aram et al. | |
| 7,924,525 B1 * | 4/2011 | Tan et al. | 360/69 |
| 2001/0022699 A1 | 9/2001 | Lacombe | |
| 2005/0117244 A1 | 6/2005 | Ranmuthu | |
| 2006/0119970 A1 * | 6/2006 | Hayashi et al. | 360/68 |
| 2008/0055760 A1 | 3/2008 | Tiwari et al. | |
| 2008/0204914 A1 | 8/2008 | Hashizume | |
| 2010/0237910 A1 | 9/2010 | Mukhopadhyay et al. | |

* cited by examiner

*Primary Examiner* — Wayne Young
*Assistant Examiner* — Mark Fischer
(74) *Attorney, Agent, or Firm* — John R. Pessetto; Wade J. Brady, III; Frederick J. Telecky, Jr.

(57) ABSTRACT

A method is provided. A first CMOS switch is deactivated while activating a second CMOS switch to cause the portion of the write signal to transition from a first direct current (DC) voltage to a first peak voltage. After a first interval, the second CMOS switch is deactivated while activating a third CMOS switch to cause the portion of the write signal to transition from the first peak voltage to a second DC voltage. After a second interval, the third CMOS switch is deactivated while activating a fourth CMOS switch to cause the portion of the write signal to transition from the second DC voltage to a second peak voltage After a third interval, the fourth CMOS switch is deactivated while activating the first CMOS switch to cause the portion of the write signal to transition from the second peak voltage to the first DC voltage.

16 Claims, 7 Drawing Sheets

US 8,643,969 B2

VOLTAGE-MODE DRIVER

TECHNICAL FIELD

The invention relates generally to a voltage-mode driver and, more particularly, to a preamplifier having a voltage-mode driver.

BACKGROUND

Within hard disk drives (HDDs), a preamplifier or preamp is generally used to perform read and write operations with a magnetic head. Typically, for write operations, the preamplifier generates a current waveform that uses a DC current to polarize magnetic elements within the disk and overshoot components to compensate for losses within the head. Turning to FIG. 1, an example of a conventional preamplifier or preamp 100 can be seen. Preamp 100 is commonly employed in hard disc drive (HDD) applications for providing write signals to a magnetic head (which is typically an inductive load). This preamp 100 is generally comprised of input buffers 102-1 and 102-2 and digital logic 104 (which includes duration generators 106-1 and 106-2, logic circuits 108-1 and 108-2, and an H-bridge). While this preamp 100 effectively drives the magnetic head, there are some issues. Namely, this type of preamp 100 can be costly because it is usually produced in a silicon-germanium (SiGe) process. This preamp 100 can consume a large amount of power and can require large supply voltages (i.e., 8V or 10V). Therefore, there is a need for an improved preamplifier.

Some other examples of conventional systems are: U.S. Pat. No. 6,285,221; U.S. Pat. No. 7,408,313; U.S. Pat. No. 7,656,111; U.S. Pat. No. 7,880,989.

SUMMARY

An embodiment of the present invention, accordingly, provides an apparatus. The apparatus comprises an input buffer; digital logic that is coupled to the input buffer, wherein the digital logic has at least one duration generator and at least one level shifter; a matching circuit that is configured to drive an inductive load; a first half H-bridge having: a first CMOS switch that is coupled to be controlled by the digital logic, that is coupled to the matching circuit, and that is configured to receive a first voltage; a second CMOS switch that is coupled to be controlled by the digital logic, that is coupled to the matching circuit and that is configured to receive a second voltage; a third CMOS switch that is coupled to be controlled by the digital logic, that is coupled to the matching circuit, and that is configured to receive a third voltage; and a fourth CMOS switch that is coupled to be controlled by the digital logic, that is coupled to the matching circuit and that is configured to receive a fourth voltage; and a second half H-bridge having: a fifth CMOS switch that is coupled to be controlled by the digital logic, that is coupled to the matching circuit, and that is configured to receive the first voltage; a sixth CMOS switch that is coupled to be controlled by the digital logic, that is coupled to the matching circuit and that is configured to receive the second voltage; a seventh CMOS switch that is coupled to be controlled by the digital logic, that is coupled to the matching circuit, and that is configured to receive the third voltage; and an eighth CMOS switch that is coupled to be controlled by the digital logic, that is coupled to the matching circuit and that is configured to receive the fourth voltage.

In accordance with the present invention, the digital logic further comprises: a first level shifter that is coupled to the duration generator and that is coupled to control the first, second, third, and fourth CMOS switches; and a second level shifter that is coupled to the duration generator and that is coupled to control the fifth, sixth, seventh, and eighth CMOS switches.

In accordance with the present invention, the first voltage is greater than the second voltage, and wherein the second voltage is greater than a common mode voltage, and wherein the common mode voltage is greater than the third voltage, and wherein the third voltage is greater than the fourth voltage.

In accordance with the present invention, the matching circuit further comprises: a first resistor that is configured to receive the common mode voltage and that is coupled to the first and fourth CMOS switches; a second resistor that is configured to receive the common mode voltage and that is coupled to the second and third CMOS switches; a third resistor that is coupled to the first and fourth CMOS switches; a fourth resistor that is coupled to the second and third CMOS switches; and a fifth resistor that is coupled to the third and fourth resistors.

In accordance with the present invention, the resistance of the first and second resistors is substantially the same, and wherein the resistance of the first and second resistors is greater than the resistances of the third, fourth, and fifth resistors.

In accordance with the present invention, each of the first, second, third, fourth, fifth, sixth, seventh, and eighth CMOS switches further comprises: a plurality of biased MOS transistors coupled together in a cascode arrangement; and a switching MOS transistor that is coupled to at least one of the biased MOS transistors and that is coupled to its level shifter at its gate and the matching circuit at its drain.

In accordance with the present invention, the matching network further comprises an inductor that is coupled to the fifth resistor.

In accordance with the present invention, the duration generator further comprises: an inverter that is coupled to the input buffer; a slewing circuit that is coupled to the inverter; a first stage that is coupled to the inverter and the slewing circuit; and a second stage having: a first logic circuit that is coupled to the first stage; and a second logic circuit that is coupled to the first stage.

In accordance with the present invention, the first logic circuit is a NAND gate, and wherein the second logic circuit is a NOR gate.

In accordance with the present invention, a method is provided. The method comprises receiving an input signal indicating a write event; generating a boost pulse and a write pulse corresponding with the write event; and generating a portion of a write signal with a half H-bridge using the boost pulse and the write pulse by: deactivating a first CMOS switch while activating a second CMOS switch to cause the portion of the write signal to transition from a first direct current (DC) voltage to a first peak voltage; after a first interval, deactivating the second CMOS switch while activating a third CMOS switch to cause the portion of the write signal to transition from the first peak voltage to a second DC voltage; after a second interval, deactivating the third CMOS switch while activating a fourth CMOS switch to cause the portion of the write signal to transition from the second DC voltage to a second peak voltage; and after a third interval, deactivating the fourth CMOS switch while activating the first CMOS switch to cause the portion of the write signal to transition from the second peak voltage to the first DC voltage.

In accordance with the present invention, the step of generating the boost pulse and the write pulse further comprises: inverting the input signal; applying the inverted input signal to a slewing circuit to generate a slewed signal; logically combining the slewed signal with a delayed input signal to generate the boost pulse; and logically combining the slewed signal with a delayed inverse of the input signal to generate the write pulse.

In accordance with the present invention, the step of logically combining the slewed signal with the delayed input signal further comprises NANDing the slewed signal with the delayed input signal.

In accordance with the present invention, the step of logically combining the slewed signal with the a delayed inverse of the input signal further comprises NORing the slewed signal with the delayed inverse of the input signal.

In accordance with the present invention, an apparatus is provided. The apparatus comprises a magnetic head; and a preamplifier having: an input buffer; a duration generator that is coupled to the input buffer; a first level shifter that is coupled to the duration generator; a second level shifter that is coupled to the duration generator; a matching circuit that is coupled to the magnetic head; a first half H-bridge having: a first CMOS switch that is coupled to be controlled by the first level shifter, that is coupled to the matching circuit, and that is configured to receive a first voltage; a second CMOS switch that is coupled to be controlled by the first level shifter, that is coupled to the matching circuit and that is configured to receive a second voltage; a third CMOS switch that is coupled to be controlled by the first level shifter, that is coupled to the matching circuit, and that is configured to receive a third voltage; and a fourth CMOS switch that is coupled to be controlled by the first level shifter, that is coupled to the matching circuit and that is configured to receive a fourth voltage, wherein the first voltage is greater than the second voltage, and wherein the second voltage is greater than a common mode voltage, and wherein the common mode voltage is greater than the third voltage, and wherein the third voltage is greater than the fourth voltage; and a second half H-bridge having: a fifth CMOS switch that is coupled to be controlled by the second level shifter, that is coupled to the matching circuit, and that is configured to receive the first voltage; a sixth CMOS switch that is coupled to be controlled by the second level shifter, that is coupled to the matching circuit and that is configured to receive the second voltage; a seventh CMOS switch that is coupled to be controlled by the second level shifter, that is coupled to the matching circuit, and that is configured to receive the third voltage; and an eighth CMOS switch that is coupled to be controlled by the second level shifter, that is coupled to the matching circuit and that is configured to receive the fourth voltage.

In accordance with the present invention, the matching circuit further comprises: a first resistor that is configured to receive the common mode voltage and that is coupled to the first and fourth CMOS switches; a second resistor that is configured to receive the common mode voltage and that is coupled to the second and third CMOS switches; a third resistor that is coupled to the first and fourth CMOS switches; a fourth resistor that is coupled to the second and third CMOS switches; a fifth resistor that is coupled to the third and fourth resistors; a sixth resistor that is configured to receive the common mode voltage and that is coupled to the fifth and eighth CMOS switches; a seventh resistor that is configured to receive the common mode voltage and that is coupled to the sixth and seventh CMOS switches; an eighth resistor that is coupled to the fifth and eighth CMOS switches; a ninth resistor that is coupled to the sixth and seventh CMOS switches; and a tenth resistor that is coupled to the eighth and ninth resistors.

In accordance with the present invention, the resistance of the first, second, sixth, and seventh resistors is substantially the same.

In accordance with the present invention, each of the first, second, third, fourth, fifth, sixth, seventh, and eighth CMOS switches further comprises: a plurality of biased MOS transistors coupled together in a cascode arrangement; and a switching MOS transistor that is coupled to at least one of the biased MOS transistors and that is coupled to its level shifter at its gate and the matching circuit at its drain.

In accordance with the present invention, the matching network further comprises: a first inductor that is coupled to the fifth resistor; and a second inductor that is coupled to the tenth resistor.

In accordance with the present invention, the duration generator further comprises: an inverter that is coupled to the input buffer; a slewing circuit that is coupled to the inverter; a first stage that is coupled to the inverter and the slewing circuit; and a second stage having: a first logic circuit that is coupled to the first stage; and a second logic circuit that is coupled to the first stage.

In accordance with the present invention, the first logic circuit is a NAND gate, and wherein the second logic circuit is a NOR gate.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
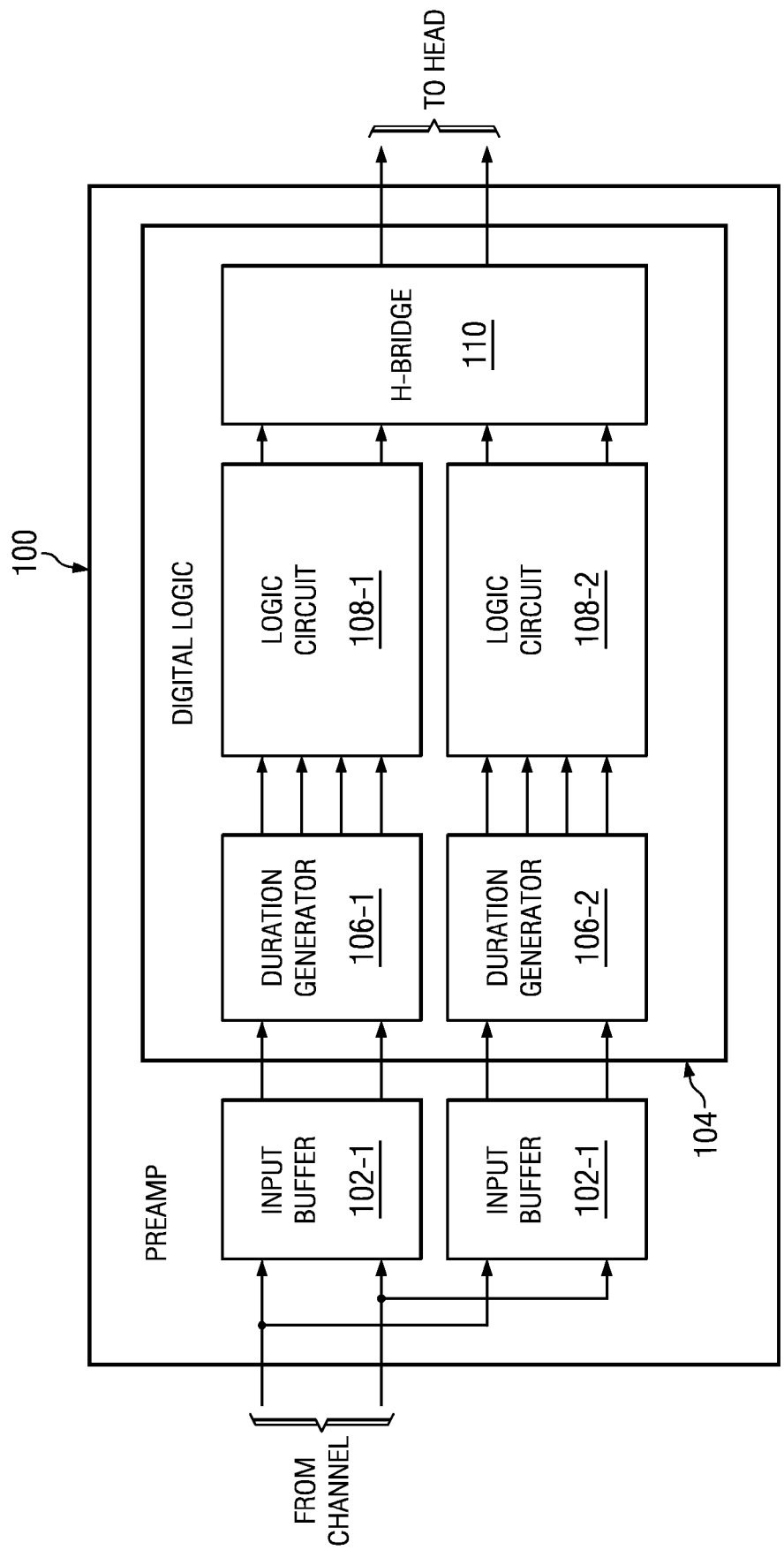
FIG. 1 is a diagram of an example of a conventional preamplifier.

Refer now to the drawings wherein depicted elements are, for the sake of clarity, not necessarily shown to scale and wherein like or similar elements are designated by the same reference numeral through the several views.

Figure 2:
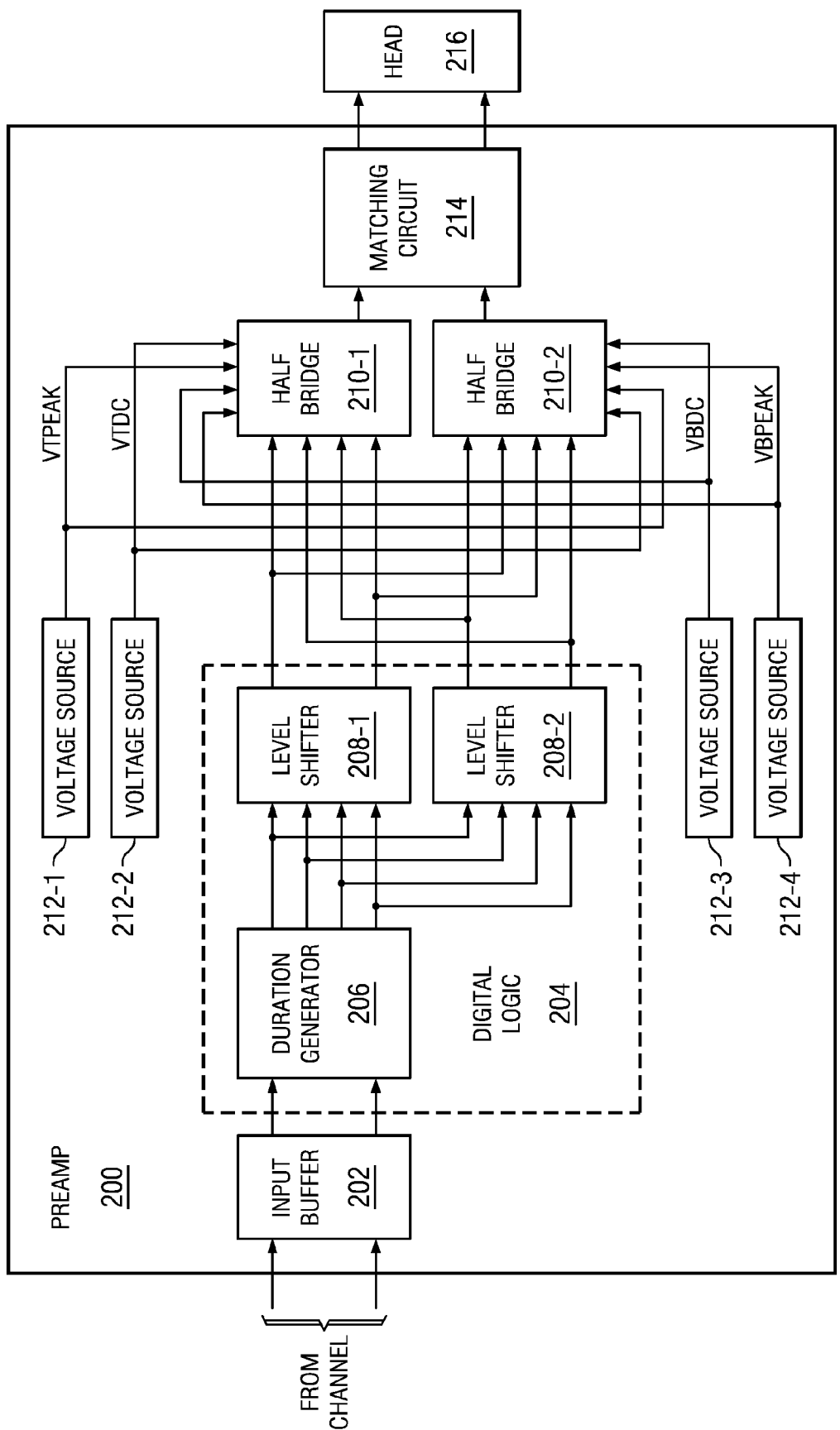
FIG. 2 is a diagram of an example of a preamplifier in accordance with the present invention.
Figure 3:
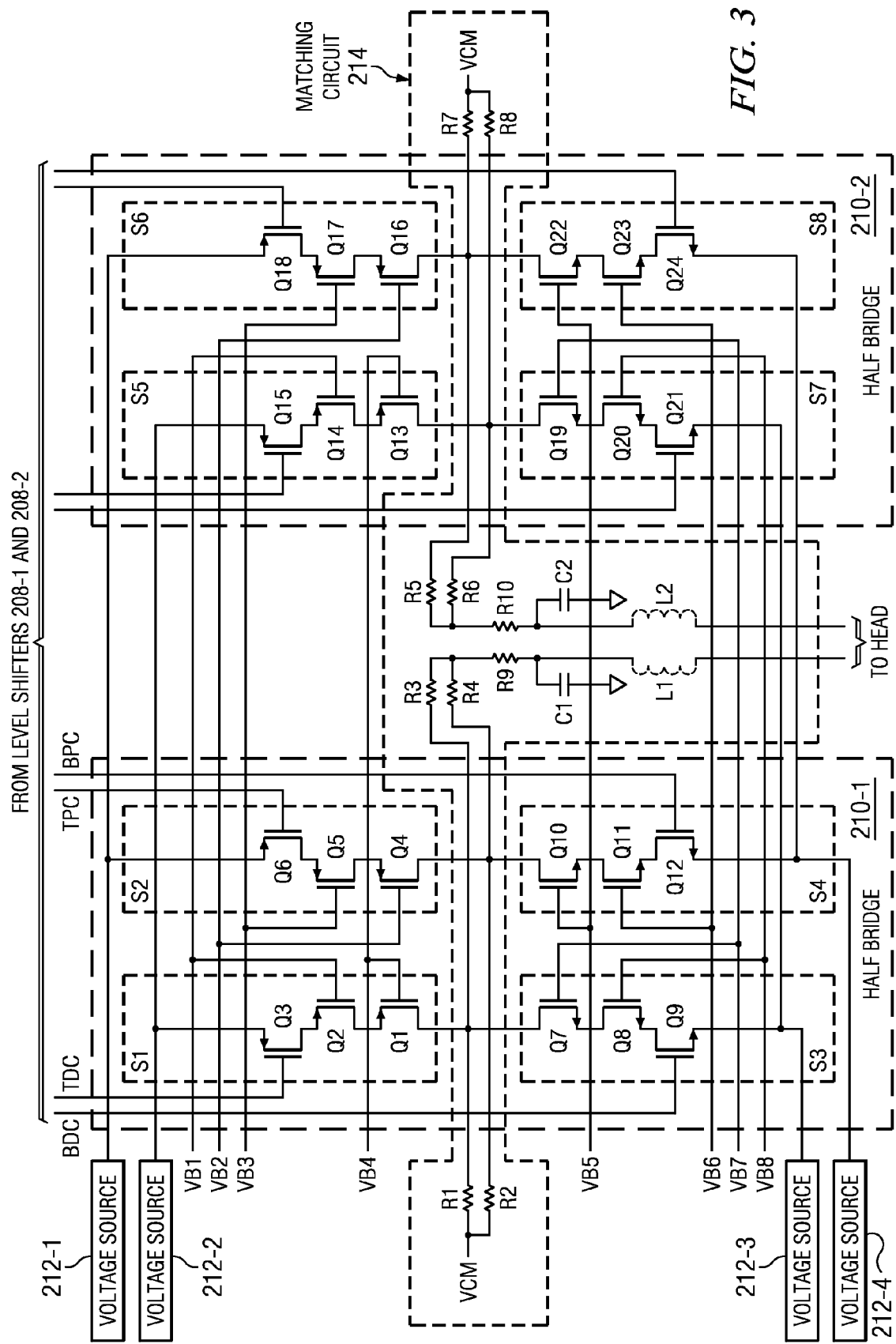
FIG. 3 is a diagram depicting an example of the half H-bridges and matching circuit of FIG. 2.
Figure 4:
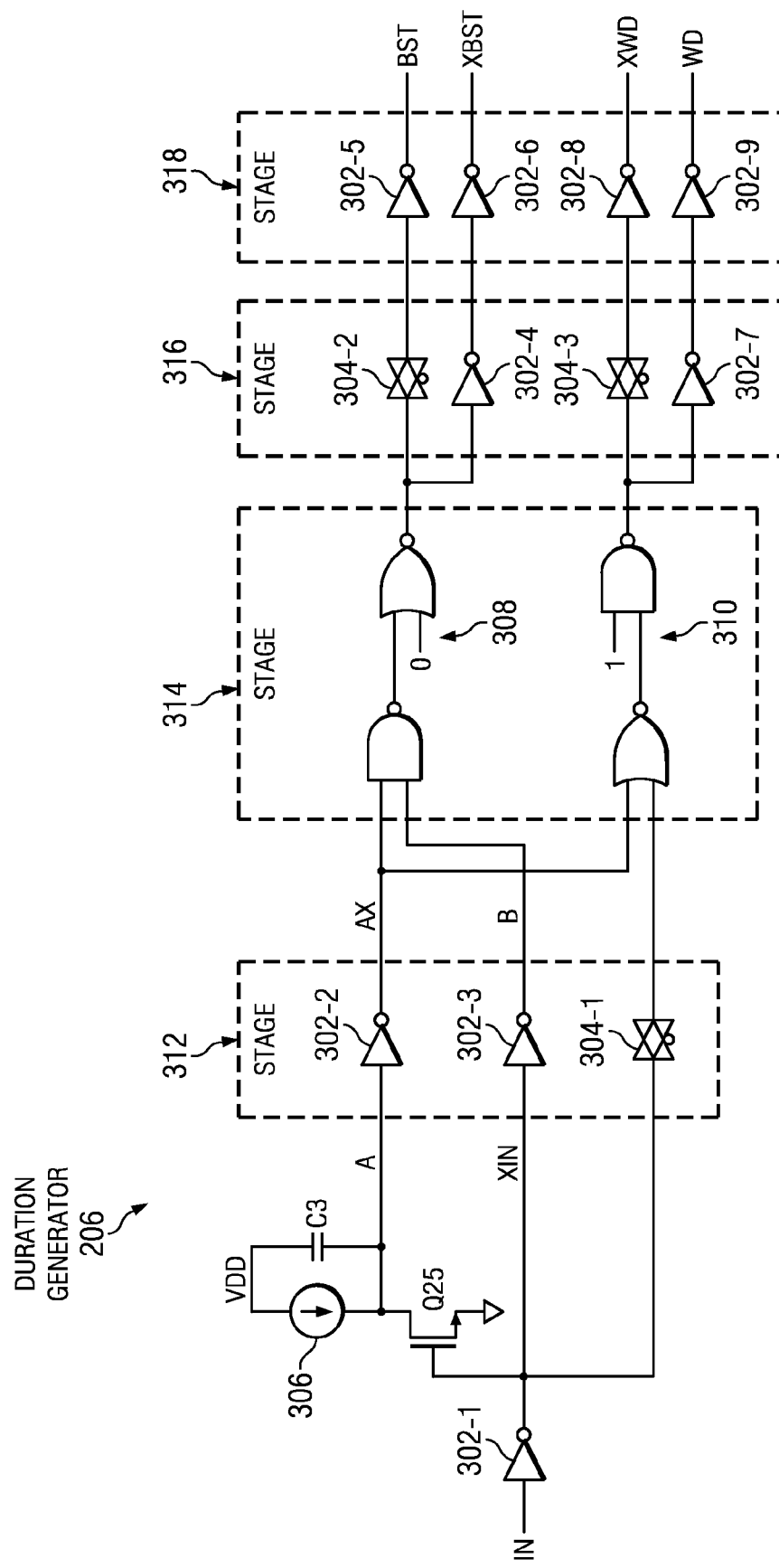
FIG. 4 is a diagram depicting an example of a portion of the duration generator of FIG. 2.

Turning to FIGS. 2-4, an example of a preamplifier 200 in accordance with the present invention can be seen. Similar to preamplifier 100, preamplifier 200 is able to generate a current waveform reflecting write events for magnetic head 216, driven at a peak current (for example) of about 100 mA over an interconnect having an impedance of (for example) about 50Ω. The current waveform uses a DC current to polarize magnetic elements within the disk and overshoot components to compensate for losses. One difference, however, is that the preamplifier 200 is formed using conventional CMOS process technologies and has low rail or supply voltages (i.e., about 4.5V and about 0V).

In order to be able to generate the current waveform that is similarly produced by preamplifier 100, preamplifier 200 employs a voltage-mode driver. This voltage-mode driver is generally comprised of half H-bridges 210-1 and 210-2 (which can generate the positive and negative portions of the differential write signal applied to head 216) and a matching circuit 214. As shown in FIG. 3, the half-H-bridges 210-1 and 210-2 employ switches S1 to S8, which are coupled to voltage sources 212-1 to 212-4. The voltage sources 212-1 to 212-4 generate voltages VTPEAK, VTDC, VBPEAK, and VBDC (respectively) that can be within a range that extends beyond the rail or supply voltages (i.e., about 4.5V and about 0V). For example, the voltages VTPEAK, VTDC, VBPEAK, and VBDC can be about 5V, about 3.2V, about −1.2V, and about −3V, respectively. Conventional above-the-rail/below-the-rail techniques (such as those employing charge pumps) may be employed to generate theses voltages VTPEAK, VTDC, VBPEAK, and VBDC. By controlling the switching of switches S1 to S8 with level shifters 208-1 and 208-2, the appropriate voltage levels can be selected to generate the current waveform for the head 216.

In order to perform the switching of switches S1 to S8, it is desirable to allow a small voltage swing (with a small current) to change the state of switches S1 to S8 from the digital logic 204. To accomplish this, each of the switches S1 to S8 are arranged as bias transistors (i.e., transistors Q1, Q2, Q4, Q5, Q7, Q8, Q10, Q11, Q13, Q14, Q16, Q17, Q19, Q20, Q22, and Q23), that are biased with bias voltages (i.e., voltages VB1 to VB8) and that are cascoded with a switching transistor (i.e., transistors Q3, Q6, Q9, Q12, Q15, Q18, Q21, and Q24). As shown, these transistors Q1 to Q24 are MOS transistors (i.e., PMOS or NMOS transistors). Looking, for example, to switch S2, PMOS transistor Q4 is coupled to voltage source 212-1 so as to receive voltage VTPEAK at its source. This transistor Q4 is also biased by voltage VB2 (which can, for example, be about 2.4V) and is cascoded with PMOS transistor Q5. Transistor Q5 is also biased by voltage VB3 (which can, for example, be about 1.2V) and is cascoded with switching transistor Q6 (which can, for example, be activated and deactivated by with a voltage swing between about 0V and about 1.2V). Fewer or more bias transistors (i.e., transistors Q4 and Q5) may be employed in switches, and the bias transistors (i.e., transistors Q4 and Q5) can be, for example, about 2 to 3 times larger than the switching transistors (i.e., transistor Q6).

Figure 5:
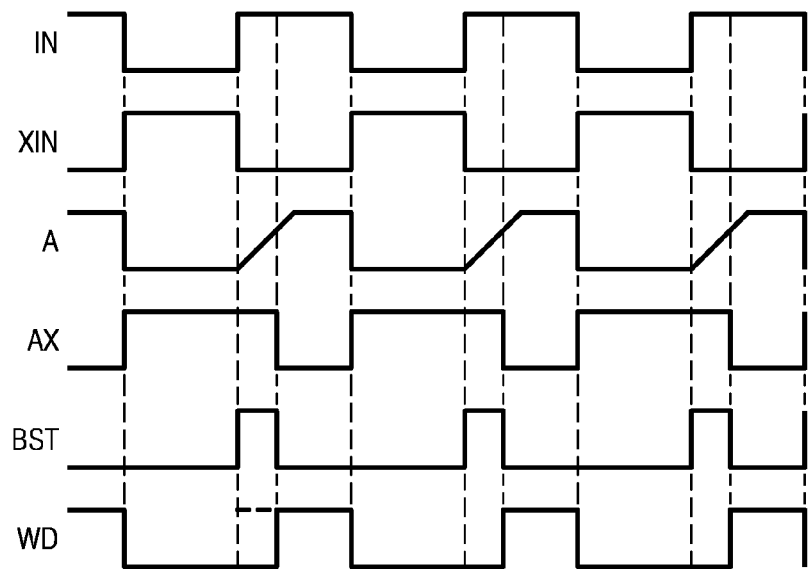
FIG. 5 is a timing diagram depicting an example operation of the portion of the duration generator shown in FIG. 3.

Turning to FIG. 5, an example of the generation of the current waveform, corresponding to a write event (or portion of the write signal) can be seen. For this example, control signals TPC, TDC, BDC, and BTC are shown with respect to switches S1 to S4 of half H-bridge 210-1, while complementary signals for half H-bridge have been omitted for the sake of clarity of illustration. Initially, at time T1, when the waveform corresponding to the write event is initiated, switch S2 is activated while switch S3 is deactivated. This allows the write signal to transition from the voltage VBDC to voltage VTPEAK to allow for an overshoot in the interval between times T1 and T2. At time T2, signal TPC deactivates switch S2 while signal TDC activates switch S1, causing the write signal to transition from voltage VTPEAK to VTDC. The write signal remains as voltage VTDC for the interval between times T2 and T3. At time T3, switch S4 is activated by signal BPC while switch S1 is deactivated. This allows for an overshoot at voltage VBPEAK for the interval between times T3 and T4. Then, at time T4, signals BPC and BDC, respectively, deactivate switch S4 and activate switch S3 to return the write signal to voltage VBDC.

Figure 6:
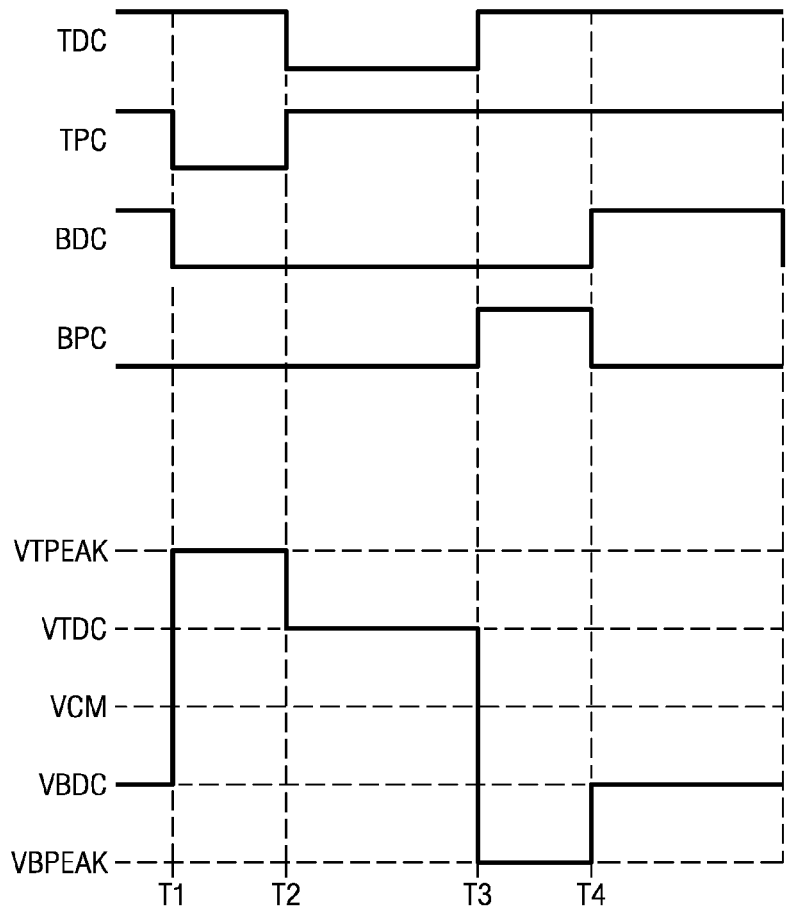
FIG. 6 is a timing diagram depicting the generation of a write signal for the preamplifier of FIG. 2.
Figure 7:
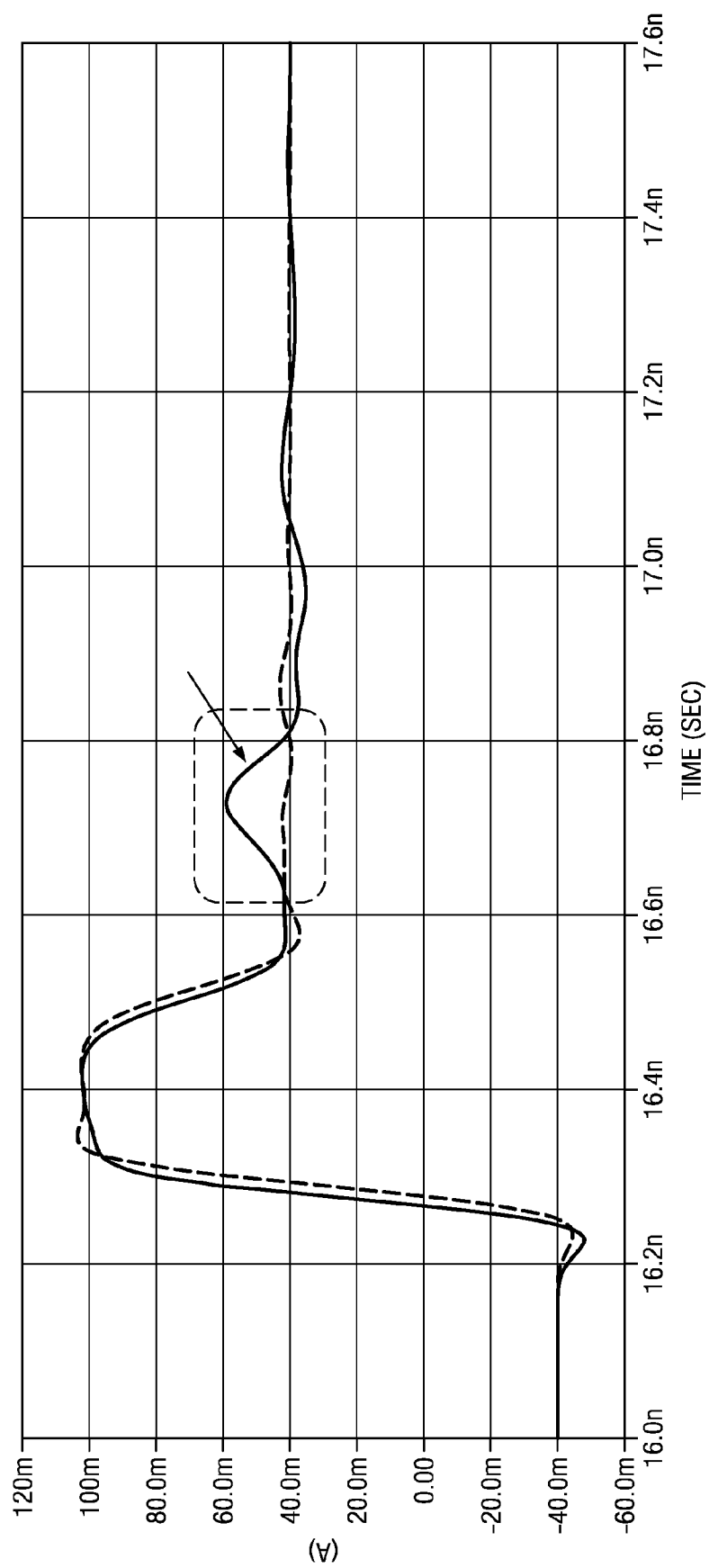
FIGS. 7 and 8 are diagrams depicting an example of the function of the matching circuit of FIG. 3.
Figure 8:
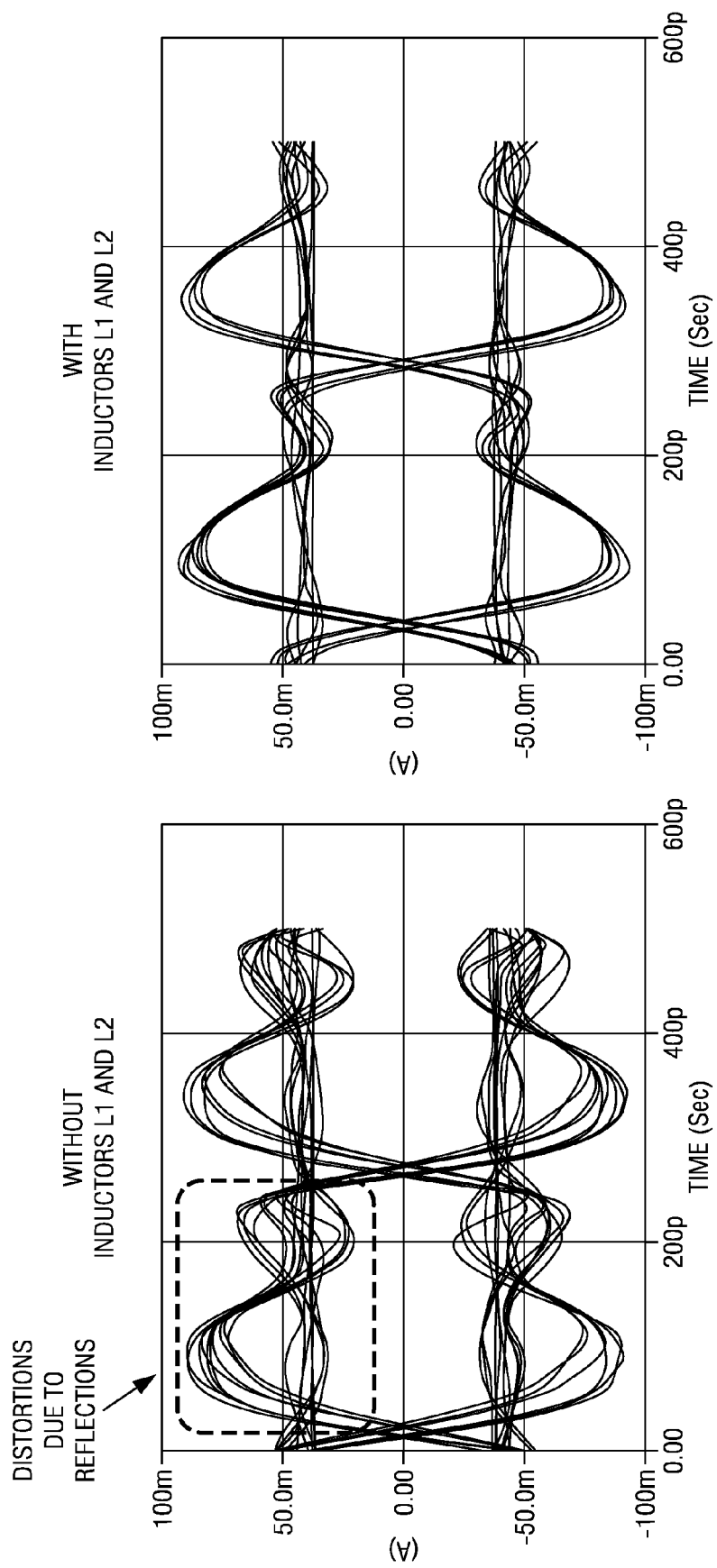

With this configuration, any capacitance at the output node (namely where the preamplifier 200 is coupled to the interconnect or head 216) modifies the output impedance long into the preamplifier 200. Because CMOS transistors are employed (i.e., transistor Q3), there is a disadvantage in terms of matching since the drain capacitance of CMOS transistors is usually much larger than collector capacitance of bipolar transistors, and because electrostatic discharge (ESD) structures (which tend to be capacitive) are usually coupled to the output nodes of the preamplifier 200, matching can be further complicated. These mismatches can cause reflections, which may degrade the write signal. So, to combat these mismatch issues, matching circuit 214 (as shown in FIGS. 2 and 3) can be employed. As shown, resistors R1, R2, R7, and R8 receives a common mode voltage VCM and are coupled to switches S1 to S8. Additionally, resistors R3 to R6, R9, and R10 are provided. Typically, resistors R3 to R6, R9, and R10 can be on the order of about 30Ω to about 50Ω, while resistors R1, R2, R7, and R8 are usually ten times larger (or greater), having, for example, a values of about 2 kΩ. Matching inductors L1 and L2 may also be included. Because the inductors L1 and L2 (which, typically, are not magnetically coupled) are in series with the matching resistances R1 to R10, the inductors L1 and L2 can tolerate a low Q, and a large variation in the inductance of inductors L1 and L2 and/or the matching capacitance of capacitors C1 and C2 can be tolerated. As a result of employing this, matching circuit 214 can be substantially reduced (as shown in FIGS. 6 and 7).

One other advantage the preamplifier 200 has over preamplifier 100 is the reduction in redundant logic. As shown in FIG. 1, preamplifier 100 includes duration generators 106-1 and 106-2, whereas preamplifier 200 employs duration generator 206 (which is shown in greater detail in FIGS. 3 and 4). The outputs from duration generator 206 are used by level shifter 208-1 and 208-2. In operation, an input signal IN is provided to inverter 302-1, and the inverted input signal XIN is provided to the slewing circuit (which is generally comprised of NMOS transistor Q25, current source 306, and capacitor C3), inverter 302-3 (of stage 312) and transmission gate 304-1 (of stage 312). When the inverter input signal XIN is provided to the slewing circuit, signal A begins to slew. Once signal A begins to slew, NAND gate 308 begins to output a boost pulse (as part of the boost signal BST) through transmission gate 304-2 and inverter 302-5, while an inverse of the boost pulse (as part of the inverted boost signal XBST) is output through inverters 302-4 and 302-6. Once signal A becomes sufficiently large, it causes inverter 302-2 (and, thus, the inverted signal AX) to change state, triggering the end of the boost pulse. Additionally, when the signal AX changes state, the NOR gate 310 is able to output a write pulse (as part of the write signal WD) through inverters 302-7 and 302-9 and an inverted write pulse (as part of the inverted write signal XWD) through transmission gate 304-3 and inverter 302-8. Moreover, to be able to achieve a proper alignment of these signals, the components within each of stages 312, 314, 316, and 318 have substantially matched delays. For example, an additional NOR gate (which receives a "0" as one of its inputs) and an NAND gate (which receives a "1" as one of its inputs) can be included so as to provide for delay matching. Also, alternatively, multiple durations generators may be employed with a level shifter in digital logic 204.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
   an input buffer;
   digital logic that is coupled to the input buffer, wherein the digital logic has at least one duration generator and at least one level shifter;
   a matching circuit that is configured to drive an inductive load;
   a first half H-bridge having:
      a first CMOS switch that is coupled to be controlled by the digital logic, that is coupled to the matching circuit, and that is configured to receive a first voltage;
      a second CMOS switch that is coupled to be controlled by the digital logic, that is coupled to the matching circuit and that is configured to receive a second voltage;
      a third CMOS switch that is coupled to be controlled by the digital logic, that is coupled to the matching circuit, and that is configured to receive a third voltage; and
      a fourth CMOS switch that is coupled to be controlled by the digital logic, that is coupled to the matching circuit and that is configured to receive a fourth voltage; and
   a second half H-bridge having:
      a fifth CMOS switch that is coupled to be controlled by the digital logic, that is coupled to the matching circuit, and that is configured to receive the first voltage;
      a sixth CMOS switch that is coupled to be controlled by the digital logic, that is coupled to the matching circuit and that is configured to receive the second voltage;
      a seventh CMOS switch that is coupled to be controlled by the digital logic, that is coupled to the matching circuit, and that is configured to receive the third voltage; and
      an eighth CMOS switch that is coupled to be controlled by the digital logic, that is coupled to the matching circuit and that is configured to receive the fourth voltage.

2. The apparatus of claim 1, wherein the digital logic further comprises:
   a first level shifter that is coupled to the duration generator and that is coupled to control the first, second, third, and fourth CMOS switches; and
   a second level shifter that is coupled to the duration generator and that is coupled to control the fifth, sixth, seventh, and eighth CMOS switches.

3. The apparatus of claim 2, wherein the first voltage is greater than the second voltage, and wherein the second voltage is greater than a common mode voltage, and wherein the common mode voltage is greater than the third voltage, and wherein the third voltage is greater than the fourth voltage.

4. The apparatus of claim 3, wherein the matching circuit further comprises:
   a first resistor that is configured to receive the common mode voltage and that is coupled to the first and fourth CMOS switches;
   a second resistor that is configured to receive the common mode voltage and that is coupled to the second and third CMOS switches;
   a third resistor that is coupled to the first and fourth CMOS switches;
   a fourth resistor that is coupled to the second and third CMOS switches; and
   a fifth resistor that is coupled to the third and fourth resistors.

5. The apparatus of claim 4, wherein the resistance of the first and second resistors is substantially the same, and wherein the resistance of the first and second resistors is greater than the resistances of the third, fourth, and fifth resistors.

6. The apparatus of claim 5, wherein each of the first, second, third, fourth, fifth, sixth, seventh, and eighth CMOS switches further comprises:
   a plurality of biased MOS transistors coupled together in a cascode arrangement; and
   a switching MOS transistor that is coupled to at least one of the biased MOS transistors and that is coupled to its level shifter at its gate and the matching circuit at its drain.

7. The apparatus of claim 6, wherein the matching network further comprises an inductor that is coupled to the fifth resistor.

8. The apparatus of claim 7, wherein the duration generator further comprises:
   an inverter that is coupled to the input buffer;
   a slewing circuit that is coupled to the inverter;
   a first stage that is coupled to the inverter and the slewing circuit; and
   a second stage having:
      a first logic circuit that is coupled to the first stage; and
      a second logic circuit that is coupled to the first stage.

9. The apparatus of claim 8, wherein the first logic circuit is a NAND gate, and wherein the second logic circuit is a NOR gate.

10. An apparatus comprising:
    a magnetic head; and
    a preamplifier having:
       an input buffer;
       a duration generator that is coupled to the input buffer;
       a first level shifter that is coupled to the duration generator;
       a second level shifter that is coupled to the duration generator;
       a matching circuit that is coupled to the magnetic head;
       a first half H-bridge having:
          a first CMOS switch that is coupled to be controlled by the first level shifter, that is coupled to the matching circuit, and that is configured to receive a first voltage;
          a second CMOS switch that is coupled to be controlled by the first level shifter, that is coupled to the matching circuit and that is configured to receive a second voltage;
          a third CMOS switch that is coupled to be controlled by the first level shifter, that is coupled to the matching circuit, and that is configured to receive a third voltage; and
          a fourth CMOS switch that is coupled to be controlled by the first level shifter, that is coupled to the matching circuit and that is configured to receive a fourth voltage, wherein the first voltage is greater than the second voltage, and wherein the second voltage is greater than a common mode voltage, and wherein the common mode voltage is greater than the third voltage, and wherein the third voltage is greater than the fourth voltage; and
       a second half H-bridge having:
          a fifth CMOS switch that is coupled to be controlled by the second level shifter, that is coupled to the matching circuit, and that is configured to receive the first voltage;
          a sixth CMOS switch that is coupled to be controlled by the second level shifter, that is coupled to the matching circuit and that is configured to receive the second voltage;

a seventh CMOS switch that is coupled to be controlled by the second level shifter, that is coupled to the matching circuit, and that is configured to receive the third voltage; and an eighth CMOS switch that is coupled to be controlled by the second level shifter, that is coupled to the matching circuit and that is configured to receive the fourth voltage.

11. The apparatus of claim 10, wherein the matching circuit further comprises:

a first resistor that is configured to receive the common mode voltage and that is coupled to the first and fourth CMOS switches;

a second resistor that is configured to receive the common mode voltage and that is coupled to the second and third CMOS switches;

a third resistor that is coupled to the first and fourth CMOS switches;

a fourth resistor that is coupled to the second and third CMOS switches;

a fifth resistor that is coupled to the third and fourth resistors;

a sixth resistor that is configured to receive the common mode voltage and that is coupled to the fifth and eighth CMOS switches;

a seventh resistor that is configured to receive the common mode voltage and that is coupled to the sixth and seventh CMOS switches;

an eighth resistor that is coupled to the fifth and eighth CMOS switches;

a ninth resistor that is coupled to the sixth and seventh CMOS switches; and a tenth resistor that is coupled to the eighth and ninth resistors.

12. The apparatus of claim 11, wherein the resistance of the first, second, sixth, and seventh resistors is substantially the same.

13. The apparatus of claim 12, wherein each of the first, second, third, fourth, fifth, sixth, seventh, and eighth CMOS switches further comprises:

a plurality of biased MOS transistors coupled together in a cascode arrangement; and a switching MOS transistor that is coupled to at least one of the biased MOS transistors and that is coupled to its level shifter at its gate and the matching circuit at its drain.

14. The apparatus of claim 13, wherein the matching network further comprises:

a first inductor that is coupled to the fifth resistor; and a second inductor that is coupled to the tenth resistor.

15. The apparatus of claim 14, wherein the duration generator further comprises:

an inverter that is coupled to the input buffer;

a slewing circuit that is coupled to the inverter;

a first stage that is coupled to the inverter and the slewing circuit; and a second stage having:

a first logic circuit that is coupled to the first stage; and a second logic circuit that is coupled to the first stage.

16. The apparatus of claim 15, wherein the first logic circuit is a NAND gate, and wherein the second logic circuit is a NOR gate.

* * * * *